A. M. KENNEDY.
FENDER FOR AUTOMOBILES AND OTHER VEHICLES.
APPLICATION FILED FEB. 19, 1914.
1,201,592.
Patented Oct. 17, 1916.
2 SHEETS—SHEET 1.
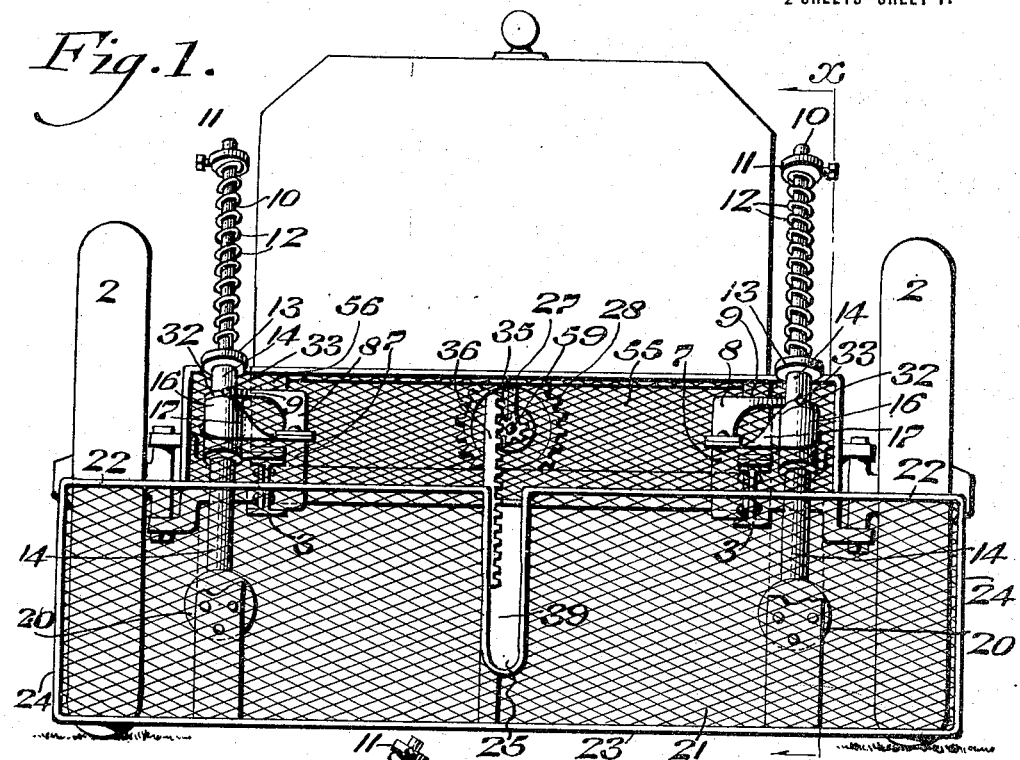
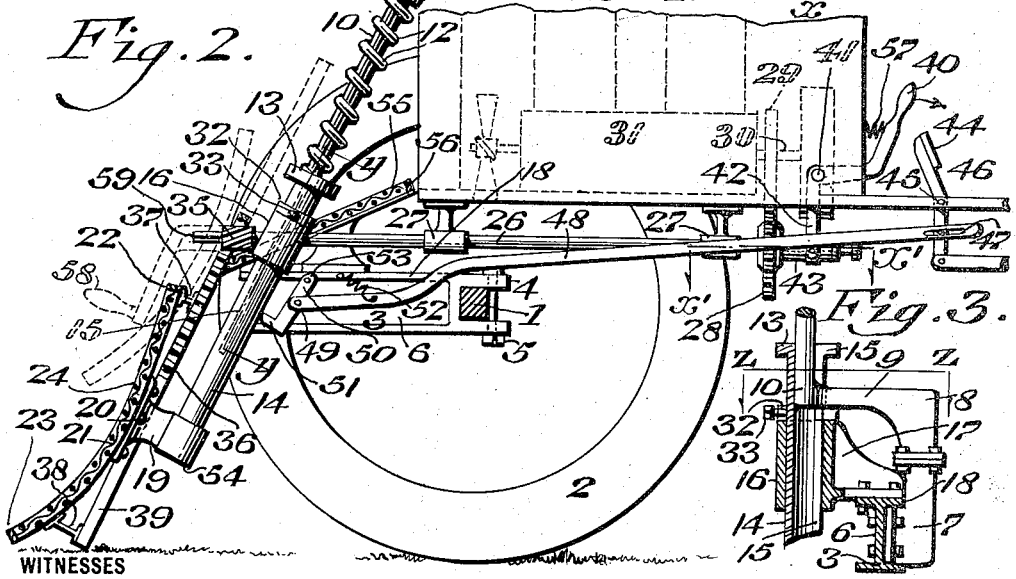

A. M. KENNEDY.
FENDER FOR AUTOMOBILES AND OTHER VEHICLES.
APPLICATION FILED FEB. 19, 1914.
1,201,592.
Patented Oct. 17, 1916.
2 SHEETS—SHEET 2.
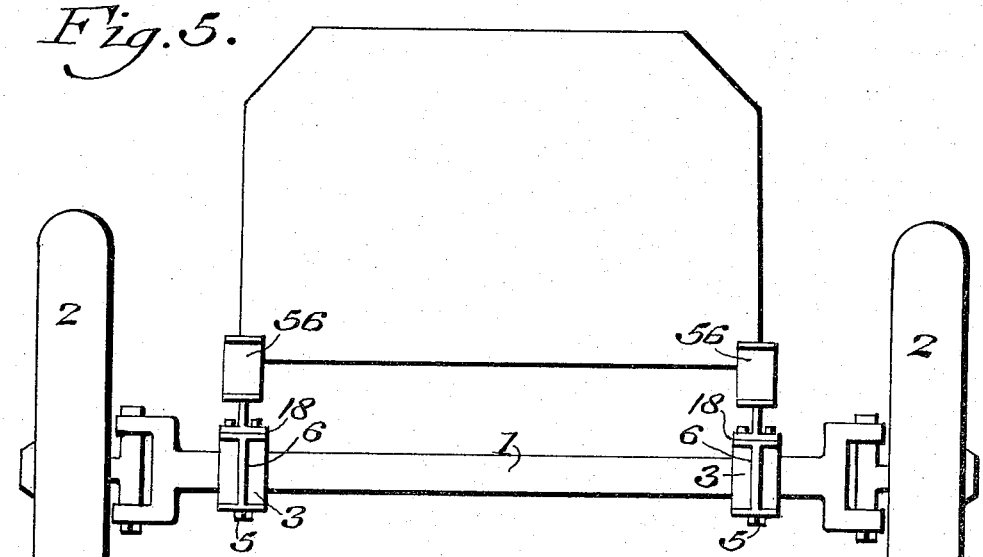
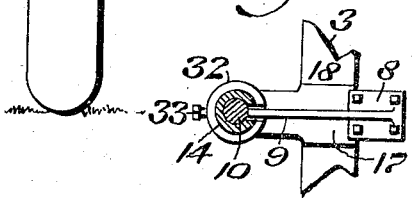
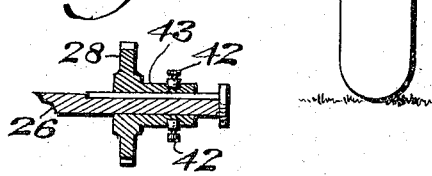
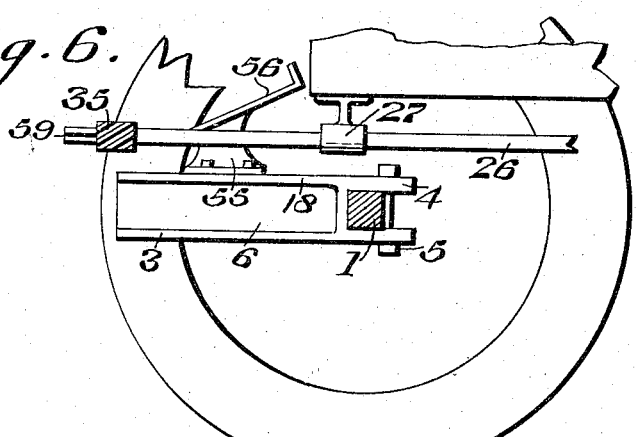
WITNESSES
P. F. Nagle.
H. G. Dieterich
INVENTOR
Arthur M. Kennedy.
BY Wiederheim & Fairbanks.
ATTORNEYS

UNITED STATES PATENT OFFICE.

ARTHUR M. KENNEDY, OF PHILADELPHIA, PENNSYLVANIA.

FENDER FOR AUTOMOBILES AND OTHER VEHICLES.

1,201,592.　　　　　Specification of Letters Patent.　　Patented Oct. 17, 1916.

Original application filed February 18, 1913, Serial No. 749,087. Divided and this application filed February 19, 1914. Serial No. 819,685.

*To all whom it may concern:*

Be it known that I, ARTHUR M. KENNEDY, a citizen of the United States, residing in the city and county of Philadelphia, State of Pennsylvania, have invented a new and useful Fender for Automobiles and other Vehicles, of which the following is a specification.

The present application is a division of my co-pending application for improvement in fender for automobiles and other vehicles, filed February 18th, 1913, Serial No. 749,087.

My invention relates to a novel construction of an automobile fender, comprising an upper, stationary member, and a lower, movable member, which latter is adapted to preferably remain normally in elevated position, provision being made for releasing said movable member and causing it to descend, in case the automobile or other vehicle is likely to hit a pedestrian or other object.

In my present invention, I provide means for normally retaining the lower or movable member of the fender in elevated position, by a suitable tripping mechanism, having connections to the brake pedal of usual construction, provision being made so that the normal or ordinary application of the brake, for the purpose of stopping the vehicle under ordinary conditions, will not release the fender, but in case of an emergency stop when a pedestrian is about to be hit, the additional pressure upon the brake pedal to effect said emergency stop, will cause the movable member of the fender to descend into operative position.

My invention also consists of novel means adapted to be thrown into engagement with a moving element of the motor or engine, whereby the lower or movable portion of the fender can be raised into elevated position, without necessitating the chauffeur or operator of the automobile or other vehicle getting out of the same.

To the above ends, my invention consists of a novel construction of fender particularly adapted for automobiles and other vehicles, the novel features of which will be hereinafter fully set forth and pointed out in the claims.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized, and that my invention is not limited to the precise arrangement and organization of these instrumentalities as herein shown and described.

Figure 1 represents a front elevation of a fender for an automobile or other vehicle embodying my invention. Fig. 2 represents a section on line $x$—$x$ of Fig. 1. Fig. 3 represents a section on line $y$—$y$ of Fig. 2. Fig. 4 represents a section on line $z$—$z$ of Fig. 3. Fig. 5 represents a front elevation of the vehicle, showing the manner of attaching the fender brackets to the front axle of the automobile. Fig. 6 represents a view, similar to Fig. 2, but showing certain parts therein omitted. Fig. 7 represents a section on line $x'$—$x'$, Fig. 2.

Similar numerals of reference indicate corresponding parts in the figures.

Referring to the drawings:—1 designates the front axle of an automobile or other vehicle, carrying the front wheels 2, which are mounted thereon in the usual manner, and provided with the usual steering appliances. 3 designates an I-beam forked at its rear portion, as indicated at 4 in Fig. 2, and provided with fastening devices 5, whereby said I-beam is readily secured to said front axle 1, two of said I-beams being employed. The central flange 6 of each I-beam 3 has secured to the inner side thereof, a bracket 7, which has secured to the upper portion thereof, the bracket 8 having the laterally extending arm 9, which terminates in the upwardly extending rod 10, upon the upper portion of which is secured the collar 11, against which abuts the upper end of the spring 12, the lower end of said spring contacting with the flange 13 of the tubular member 14, which is provided with the longitudinally extending slot 15, whereby said tube 14 is free to ride freely up and down on the rod or bearing 10. The tube 14 is loosely mounted in the sleeve 16, which is provided with the offset 17, which is secured to the top flange 18 of the I-beam 3, as will be understood from Fig. 3. The lower end of the tube 14 is secured to the arm 19, having the flange 20, to which is secured the movable fender member 21, the latter being composed of the top and bottom rails 22 and 23, joined by the outer end portions 24, between which a suitable netting is supported, the top rail 22 being provided with a U or other shaped slot 25 therein, through which projects the shaft 26, which is mounted in suitable bearings 27, and carries on its inner portion the gear or pinion 28, which is adapted to mesh with a gear 29 carried on a shaft 30 of the engine or motor 31. The tube 14 is provided with a collar 32 held in position on said tube by the set screw 33, whereby the extent of downward motion of said tube 14 and the lower movable fender 21, is regulated.

The outer extremity of the shaft 26 is provided with a pinion 35, which is in mesh with the rack 37, the latter being secured to the rear of the movable fender 21 by means of the upper and lower brackets 37 and 38, it being evident that the lower portion of the rack 36 is mutilated, as indicated at 39, so that when the rack reaches its extreme highest position, when the lower fender member 21 is up, the teeth on the pinion 35 will not be stripped.

40 designates an operating lever for effecting the engagement of the pinion 28 with the gear 29, said lever being elbow-shaped and fulcrumed at the point 41 and forked, as indicated at 42, so as to engage the sleeve 43, which is splined to the shaft 26, said sleeve 43 and gear or pinion 28 being capable of longitudinal movement in unison upon the shaft 26, as will be understood from Fig. 7.

44 designates the brake pedal of the usual construction, which is fulcrumed at 45 and has the pin 46 engaging the slot 47 of the link 48, which is pivoted at the point 49 to the dog 50, which is fulcrumed at the point 53, said dog having the nose 51 which is adapted to engage the lower edge 54 of the arm 19 when the lower fender 21 is raised into its uppermost position.

52 designates a spring, adapted to normally hold the parts in the position seen in Fig. 2.

55 designates the stationary fender, which is supported upon the brackets 56, which are secured to the top flange 18 of the I-beams 3.

The operation is as follows:—The short I-beams 3, and the brackets 56 are readily assembled on the axle 1, as will be understood from Figs. 5 and 6. The brackets 7 and 8 and the sleeves 16 and the tubes 14, are also readily assembled, as will be understood from Figs. 3 and 4, and the fender members being assembled, the parts will normally appear as seen dotted in Fig. 2, the lower or movable fender member being normally in elevated position, the nose 51 of the dog 50 engaging the under side 54 of the arm 19. When the brake pedal 44 is moved for an ordinary stop, the rod 48 will remain stationary, but when said brake pedal is moved to the extreme position indicated for an emergency stop, the pin 46 will contact with the rear wall of the slot 47 and pull the nose 51 out of engagement with the wall 54, and the lower fender member 21 being unsupported, will be impelled downward by the tension of the springs 12, and the parts will appear as seen in Fig. 1, and in full lines in Fig. 2.

By the provision of the rear slots 15 in the tubes 14, the latter move freely in their sleeves 16, their extent of movement being limited by the collars 32 secured to said tubes, contacting with the top of the sleeves 16. To raise the lower fender 21, it is only necessary for the operator to actuate the lever 40 in the direction of the arrow, seen in Fig. 2, whereupon the pinion 28 is thrown into mesh with the gear 29 of the engine and the rotation of the rod 26 and pinion 25 will, by reason of the engagement of the latter with the rack 36, elevate the latter, and the fender 21, to the position seen dotted in Fig. 2, the spring 52 serving to hold the fender tripping mechanism at all times in proper position. The handle 40 may be normally held in the desired position by a suitable spring 57, which will cause the pinion 28 to be normally out of mesh with the gear 29.

It will be apparent that in my fender construction, the parts normally lie in a position where they will not interfere with the ordinary travel of the vehicle, and they are supported without the provision of complicated parts, and the operating means employs but a few parts and is so located as to be inconspicuous, the movable fender member being released merely by the operation of the ordinary foot pedal, when an emergency stop is desired in case of an impending accident. If desired, the lower fender 21 can be raised, by the application of the ordinary crank 58 to the squared end 59 of the shaft 26, in which case the handle 40, pinion 28 and their adjuncts may be dispensed with.

It will be seen from the foregoing, that the upper, stationary member 55 may be located at any desired angle between the wheels in front of the radiator, while the lower, movable fender member 21 overlaps or extends outside of the front wheels 2 of the vehicle, and moves up and down in front of said upper member 55, said lower or movable member, if desired, being permitted to normally rest in its downward position, although I prefer in practice to have said lower or movable member normally in elevated position, so that when the brake is applied gradually for ordinary purposes, the movable member will be retained in its upward position, but when an emergency arises or a pedestrian or child gets in front of the vehicle, and the brake is applied for an emergency stop, the additional downward movement of the brake pedal will cause the fender to drop, and protect the person or object hit, from injury.

It will be apparent that my novel fender, when the movable member is in its lowermost position, as seen in Fig. 3, will cover the whole front and wheels of the automobile, thus making it practically impossible for any person, however struck by the vehicle in motion, to fall under it or under the wheels, and to be fatally hurt thereby. The I-beams and the brackets attached thereto, whereby the fender is placed in position, can be readily assembled without skilled labor, the resultant structure is both light, strong and well braced, being instantaneous in action, as above explained.

My novel fender construction does not interfere with the lights or with the necessary influx of air to the radiator, and is out of the way when not needed, giving full under clearance required. The fender operating mechanism is controlled absolutely by the driver without any additional effort on his part, but solely by obedience to the natural impulse to apply the brake under emergency conditions, at the time of impending accident, and there will be no interference with the operation of the regular brake mechanism, should the fender be injured. My novel fender is easily adjusted or adaptable to any make or style of automobile, as it can be readily attached to the front axle thereof, and is not complicated or likely to get out of repair, and is not unsightly or cumbersome. It is readily removed, and does not hamper the replacing or inspection of the front tires, and is comparatively inexpensive to install.

Where I have shown my novel construction of fender in the present instance as operated by springs, it will be understood that such springs may be dispensed with, if desired, and the fender may be sufficiently heavy so as to drop by gravity or other mechanism, and in place of the rack and pinion mechanism employed, the fender can be raised by hand, if desired.

It will of course be evident that the foot operating mechanism may be other mechanism than the regular brake operating mechanism, but I prefer to employ the regular brake operating mechanism, since it is desirable to reduce the mechanism under the control of the foot of the chauffeur to as few parts as possible.

It will be apparent from the foregoing that my novel device is not only a safeguard and the like to pedestrians and others on the highways, but in use it will furnish a positive proof, if necessary, of the application of the brake, and if the speed has not been excessive and the usual warning been given, it will indicate by its operation, that everything possible to avoid a fatal accident had been done by the chauffeur or driver of the automobile.

It will now be apparent that I have devised a novel and useful construction of a fender for automobiles and other vehicles, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a fender for automobiles and other vehicles, an upper, stationary member, a lower, movable member, connections secured to the front axle of the vehicle upon which said upper and lower fender members are supported, a brake pedal, connections from said brake pedal to said movable fender for effecting the tripping of the latter, a motor, and transmission devices including a clutch, to connect said motor with or disconnect it from said movable member.

2. In a fender for automobiles and other vehicles, a stationary, upper member suitably supported, a movable, lower fender member, connections from a brake member to trip said lower fender and cause the same to descend upon the actuation of the brake mechanism, a rack carried by said lower fender member, a rotatable shaft suitably supported, and having a pinion thereon engaging said rack, and means for actuating said shaft from the motor or engine of the vehicle.

3. The combination, in a vehicle fender, of a fender member movable to operative or inoperative position, means for moving said fender from operative to inoperative position, detachable means for temporarily retaining the movable fender member in inoperative position, a brake lever, and a connection between the same and said fender-retaining means whereby, when the brake lever is operated to apply the brakes, it will simultaneously actuate said retainer and permit the fender to move from inoperative to operative position, said brake lever connection having a lost motion element whereby a certain amount of movement of the brake lever is permissible without operating the fender retainer.

ARTHUR M. KENNEDY.

Witnesses:
 FREDERICK H. CUMMING,
 SARAH E. MCWHINNIE.